INVENTOR.
FRANK T. PALMER

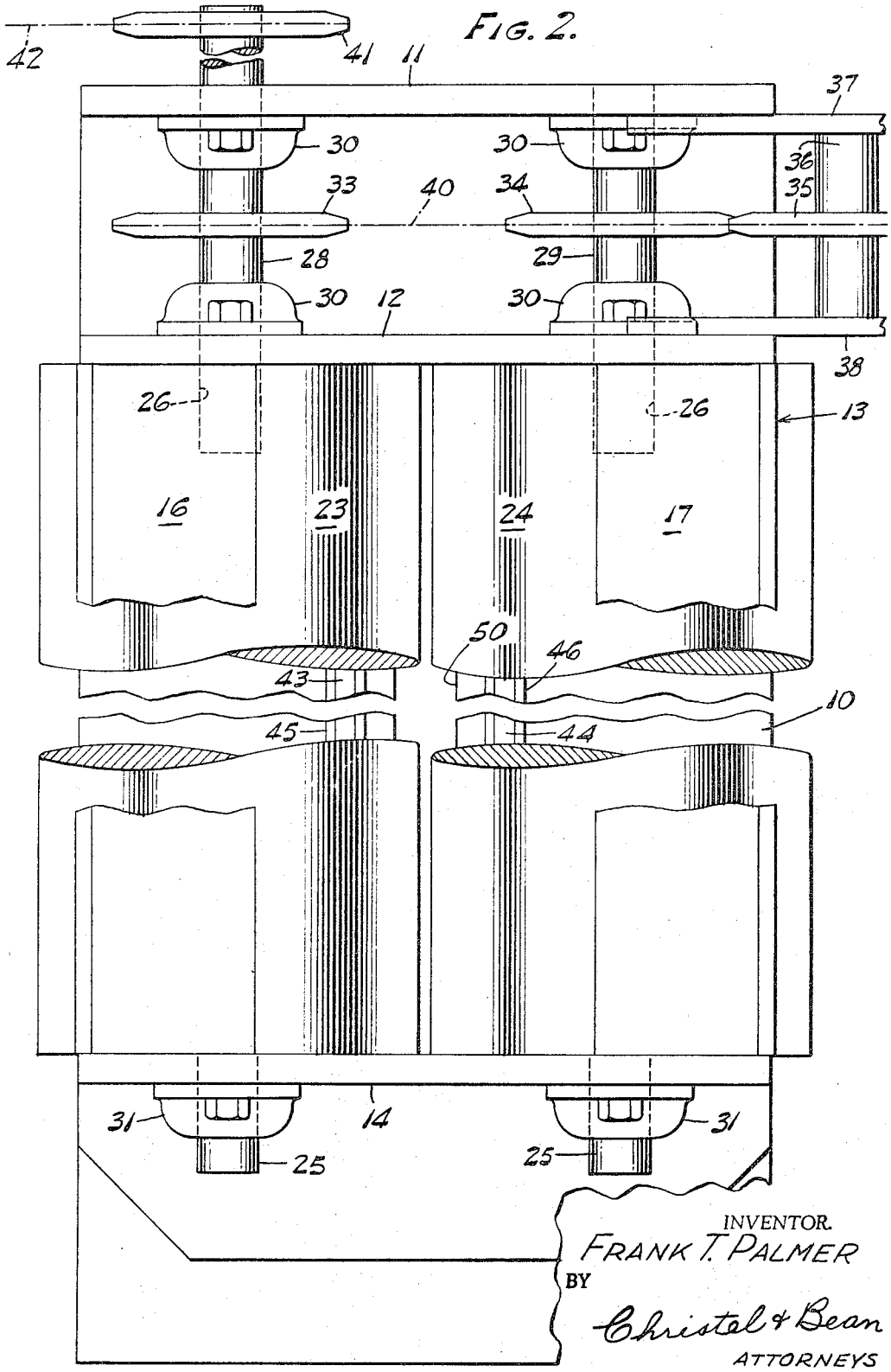

though is passed between a pair of smooth rolls into what may be referred to as a decompression space beneath the rolls and thence through an extrusion slot beneath this space. The dough sheet issuing from the slot is deposited upon a moving conveyor belt running at the same surface speed as the rolls and the gap between the rolls is substantially the same as the width of the aforesaid extrusion slot.

3,326,144
DOUGH SHEET FORMING APPARATUS
Frank T. Palmer, 965 Kingston Drive,
Olean, N.Y. 14760
Filed Jan. 11, 1965, Ser. No. 424,781
1 Claim. (Cl. 107—12)

ABSTRACT OF THE DISCLOSURE

A machine which extrudes a sheet of dough through an elongated nozzle. The dough is compressed above the nozzle by rollers mounted across the bottom of a dough hopper. Removal of one of the hopper walls permits easy removal of the rollers.

---

Figure 1:
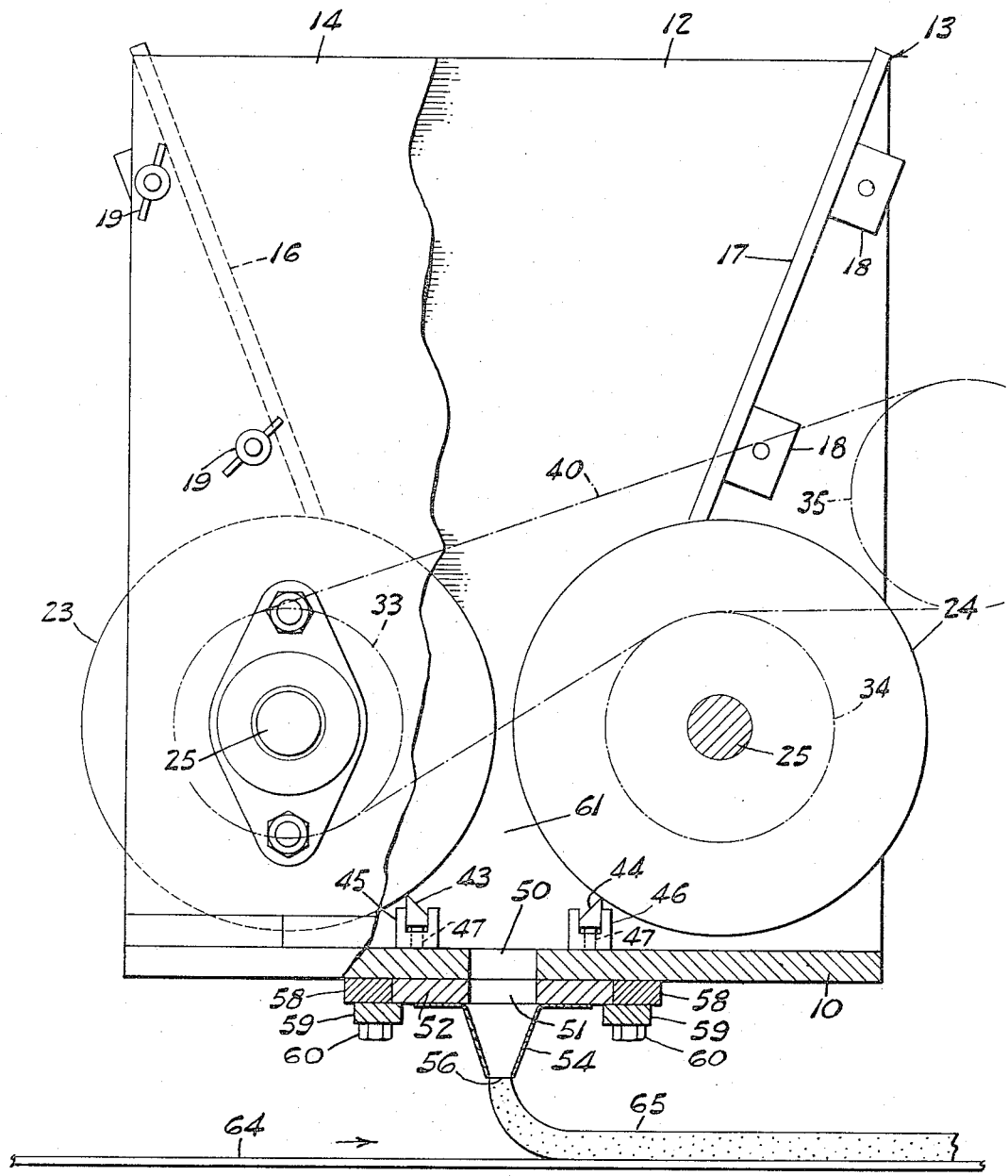

This invention relates to means for forming a continuous sheet of dough for use in producing baked goods, particularly cookies.

Cookie dough is more moist and sticky than other doughs which are commonly formed into sheets, such as pie crust dough, for instance. It is therefore much more difficult to handle and cannot be effectively dealt with by conventional dough sheet forming apparatus. Despite the stickiness of the dough and the resultant adherence thereof to the sheet forming apparatus, cookie dough is affected very adversely by too great an amount of working or compression or compaction. Furthermore, the usual means for combatting sticking of dough in forming sheets, coating the same with flour or coating surface with which the dough comes in contact with flour, is undesirable since it renders the dough too dry and tough for ideal cookie production.

In addition to the stickiness of dough suitable for making cookies, a considerable problem in preparing dough sheets for this purpose is due to a condition similar to what is known as "elastic memory" in the thermoplastic molding art. That is, the dough after passing through sheet forming rolls tends to re-expand to a thickness substantially greater than the gap between the rolls. The degree of re-expansion is unpredictable and difficult to control since it varies with various conditions such as the pressure on the dough, the condition of the dough as to moisness and other variables, and other factors not precisely known.

For the foregoing reason satisfactory cookie sheet forming results are not achieved by merely passing the dough through conventional dough sheet forming apparatus. I have found that cookie dough sheets of uniform thickness and the desired lightness and fluffiness are formed when the dough is passed between a pair of smooth rolls into what may be referred to as a decompression space beneath the rolls and thence through an extrusion slot beneath this space. The dough sheet issuing from the slot is deposited upon a moving conveyor belt running at the same surface speed as the rolls and the gap between the rolls is substantially the same as the width of the aforesaid extrusion slot.

While the theoretical reasons for the unusually good and uniform results obtained in the cookie dough sheet forming apparatus of the present invention cannot be stated with certainty, it appears that the factors stated in the preceding paragraph are critical and are controlling in producing a light, flluffy cookie dough sheet of uniform thickness. The related steps in the general process are conventional, that is, a cloth surfaced conveyor belt on which the cookie dough sheet is deposited by the apparatus of the present invention is first dusted with flour by use of a conventional flour duster. After the dough sheet has been deposited on the belt the upper surface is dusted with flour and the belt passes beneath cnventional rolling mechanism where the sheet is rolled and thereafter the cookie forms are cut from the dough sheet and transferred to cookie pans or baking sheets.

While a single specific embodiment of the principles of the present invention is illustrated in the accompanying drawings and described in detail in the following specification, it is to be understood that such embodiment is by way of example only and that various mechanical modifications may be made without departing from the spirit of the invention, the scope of which is limited only as defined in the appended claim.

In the drawings:

FIG. 1 is a general side elevational view of one form of the cookie dough sheet forming apparatus of the present invention with portions thereof broken away for added illustration; and FIG. 2 is a fragmentary top plan view of the structure of FIG. 1.

In the drawings like characters of reference denote like parts and the general support structure of the dough feeder and dough sheet forming apparatus of the present invention comprises a lower generally horizontal support plate 10 having a pair of spaced vertical walls 11 and 12 secured rigidly thereto at their lower edges. Wall 12 comprises one end wall of a dough-receiving hopper designated generally by the reference numeral 13.

The other end wall of hopper 13 is designated 14 and is associated with the hopper in such manner that it may readily be removed for cleaning the hopper and associated feeding apparatus in a manner which will presently appear. The side walls of hopper 13 comprise a pair of downwardly converging plates 16 and 17 which are rigidly secured to vertical wall 12 in any desired manner to provide a relatively permanent three-walled hopper portion. The fourth wall comprises removable end wall 14 and the adjacent portions of converging side walls 16 and 17 have lugs 18 for receiving wing nut and bolt assemblies 19 whereby the end plate or wall 14 is associated with the remainder of the hopper structure for convenient assembly and removal.

The lower portion of the chamber within hopper 13 is formed generally by the peripheries of a pair of rolls 23 and 24. These rolls have smooth peripheries and are removable from the hopper structure by removal of end wall 14. For this purpose each roll 23 and 24 has a stub shaft portion 25 at one end and a bore 26 at its other end which is splined or formed with keyways to receive correspondingly splined or keyed end portions of shafts 28 and 29.

Shafts 28 and 29 are more or less permanently mounted for rotation in vertical walls 11 and 12 as by means of bearings 30. Removable end wall 14 is provided with bearings 31 in which the stub shaft formations 25 of rolls 23 and 24 rotate. When end wall 14 is removed the rolls may merely be withdrawn from the splined or keyed ends of shafts 28 and 29 in an obvious manner. Thus the entire hopper and roll structure is easily cleaned and reassembled.

The rolls 23 and 24 are rotated synchronously with the facing sides of their peripheries moving downwardly by means of sprockets 33 and 34 fixed, respectively, to the shafts 28 and 29, and an idler sprocket 35 which is mounted on a shaft 36 which is supported in brackets 37 and 38 carried by vertical walls 11 and 12, respectively. An endless chain 40 engages the sprockets 33, 34 and 35 as shown in FIG. 1. Shaft 28 carries a sprocket 41 which is connected by a chain 42 to a companion sprocket driven from the conveyor drive or transmission mechanism, the sprockets being so proportioned that rolls 33 and 34 rotate at the same peripheral surface speed as the surface speed of the conveyor on which the dough sheet is deposited.

A pair of scraper bars 43 and 44 mounted in channels 45 and 46 extend parallel to the axes of rolls 23 and 24. Channels 45 and 46 are fixed to support plate 10 as shown in FIG. 1 and the scraper bars are mounted for vertical adjustment in channels 45 and 46 by means of adjusting set screws 47. Thus the rolls are continuously scraped to free them of adherent dough.

An elongated opening 50 is formed in support plate 10 in alinement with the gap between rolls 23 and 24 and a registering opening 51 is formed in a die plate 52 which is removably disposed at the underside of support plate 10. The registering openings 50 and 51 open into the upper end of an extrusion member 54 whose side walls converge downwardly to form a dough extrusion slot or opening 56 at the lower end of member 54 which is of substantially the same width as the gap between rolls 23 and 24.

Extrusion member 54 is affixed to the underside of die plate 52 and the latter is slidably mounted between rails 58 and held therebetween by further rail members 59, the rails 58 and 59 being secured to the bottom of support plate 10 by screws 60. When removable wall 14 is disassembled as described above the assembly comprising die plate 52 and extrusion member 54 may be removed by sliding the same in a horizontal direction.

It will be noted that the space between the rolls 23 and 24 below the centers thereof, and as further defined by the scraping bars 43 and 44, the channels 45 and 46, and the upper surface of support plate 10 between the channels, forms what may be called an expansion or decompression chamber 61 into which the dough may expand after passing between the gap between rolls 23 and 24. Actual commercial use of the foregoing arrangement demonstrates that dough which feeds from the extrusion member 54 by a combination of gravity and under the urge imparted by the rolls 23 and 24 retains the desired texture and is ideal for cookie manufacture.

In FIG. 1 a horizontally moving conveyor belt is indicated at 64 and a dough sheet being deposited thereon from extrusion member 54 is designated 65. As indicated earlier herein, sprocket 41 is connected with the conveyor drive or transmission mechanism by a chain and sprocket mechanism so proportioned, as to drive ratio, as to produce substantially equal surface speeds as between the peripheries of rolls 23 and 24 and the conveyor belt 64.

What is claimed is:

Apparatus for forming a continuous sheet of dough comprising a hopper for receiving a mass of dough, said hopper comprising a pair of side walls and a pair of end walls, a pair of rolls supported and driven for joint rotation in opposite directions on axes lying in a common horizontal plane and extending generally parallel to said side walls, said rolls being spaced a predetermined distance apart and jointly forming the bottom of said hopper, one of said end walls being removably attached to said side walls, said rolls having shaft portions bearing rotatably in said one end wall, and drive shaft members rotatably supported in said other end wall and having projecting portions fitting slidably within the adjacent ends of said rolls, whereby removal of said one end wall permits removal of said rolls by withdrawing them from said projecting shaft portions, the proximate peripheral portions of said rolls moving downwardly to feed dough from said hopper downwardly between said rolls.

References Cited

UNITED STATES PATENTS

| 375,168 | 12/1887 | Langles | 107—14 |
| 893,005 | 7/1908 | Mitchell | 107—12 |
| 1,382,926 | 6/1921 | Mitchell | 107—14 X |
| 2,149,927 | 3/1937 | Pellar | 107—12 |
| 2,909,131 | 10/1959 | Baur | 107—12 |

FOREIGN PATENTS

| 289,240 | 4/1928 | Great Britain. |
| 438,893 | 8/1948 | Italy. |

WALTER A. SCHEEL, *Primary Examiner.*

J. M. NEARY, *Assistant Examiner.*